United States Patent
Shi et al.

(10) Patent No.: US 9,488,817 B2
(45) Date of Patent: Nov. 8, 2016

(54) IMMERSION OBJECTIVE AND LIGHT MICROSCOPE

(71) Applicant: Carl Zeiss Microscopy GmbH, Jena (DE)

(72) Inventors: Renhu Shi, Goettingen (DE); Werner Kleinschmidt, Adelebsen (DE); Georg Herbst, Goettingen (DE); Holger Richter, Neu-Eichenberg (DE); Carsten Hoyer, Juehnde (DE)

(73) Assignee: Carl Zeiss Microscopy GmbH, Jena (DE)

( * ) Notice: Subject to any disclaimer, the term of this patent is extended or adjusted under 35 U.S.C. 154(b) by 605 days.

(21) Appl. No.: 13/860,091

(22) Filed: Apr. 10, 2013

(65) Prior Publication Data

US 2013/0271847 A1   Oct. 17, 2013

(30) Foreign Application Priority Data

Apr. 12, 2012 (DE) ........................ 10 2012 007 359

(51) Int. Cl.
*G02B 21/02* (2006.01)
*G02B 21/33* (2006.01)
*G02B 27/00* (2006.01)

(52) U.S. Cl.
CPC ............... *G02B 21/02* (2013.01); *G02B 21/33* (2013.01); *G02B 27/0068* (2013.01)

(58) Field of Classification Search
CPC ............................... G02B 21/33; G02B 21/02
USPC .................................................. 359/656–661
See application file for complete search history.

(56) References Cited

U.S. PATENT DOCUMENTS

2006/0087745 A1*  4/2006  Fahlbusch .............. G02B 21/33
                                                             359/656
2009/0310229 A1* 12/2009  Yang .................. A61B 1/00096
                                                             359/694

FOREIGN PATENT DOCUMENTS

| DE | 102006052142 A1 | 5/2008 |
| DE | 102008006826 A1 | 8/2009 |
| DE | 102008026774 A1 | 12/2009 |
| EP | 1548483 A1 | 6/2005 |

OTHER PUBLICATIONS

Application No. EP 2650713, European Search Report, Jun. 26, 2013, 3 pages.

\* cited by examiner

*Primary Examiner* — Scott J Sugarman
(74) *Attorney, Agent, or Firm* — Hoffman Warnick LLC

(57) ABSTRACT

An immersion objective for a light microscope with a first lens group including a first and second lenses, with a third lens arranged behind the first lens group, a first air gap between the first lens group and the third lens, with a second lens group behind the third lens and including fourth, fifth and sixth lenses, a second air gap formed the third lens and the second lens group, and a third lens group behind the second lens group including seventh, eighth and ninth lenses. Tenth, eleventh and twelfth lens are provided behind the third lens group. For correction of aberrations a fourth air gap is formed between the third lens group and the tenth lens, a fifth air gap is formed between the tenth lens and the eleventh lens and a sixth air gap is formed between the eleventh lens and the twelfth lens.

23 Claims, 10 Drawing Sheets

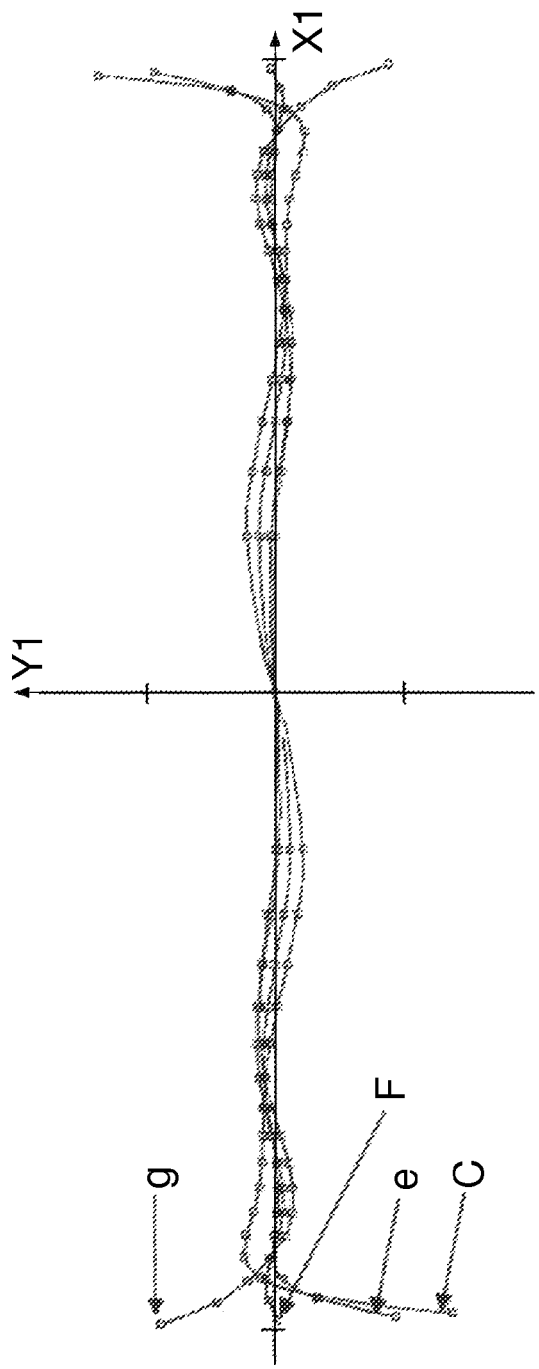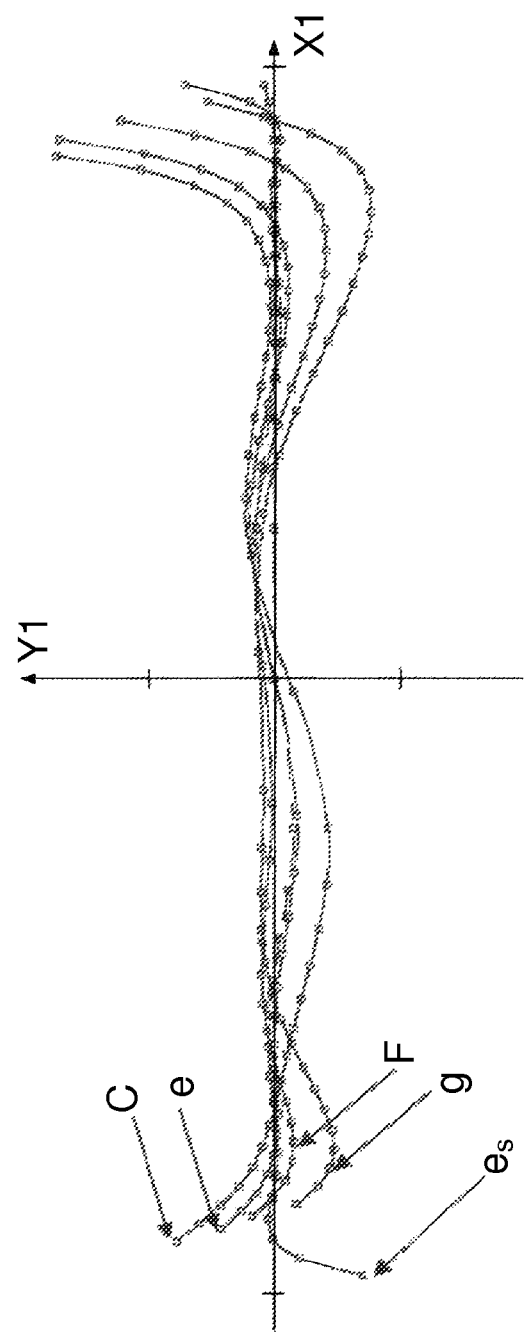
Fig. 6
Fig. 7

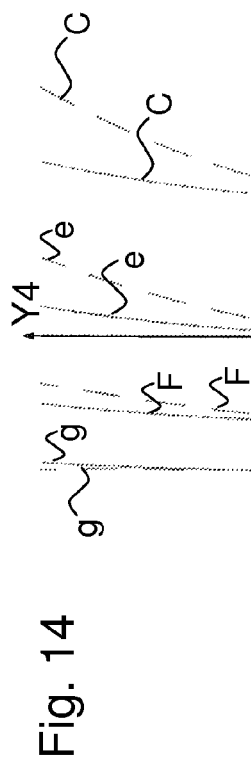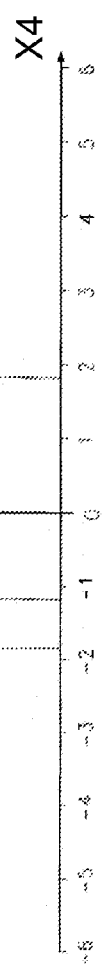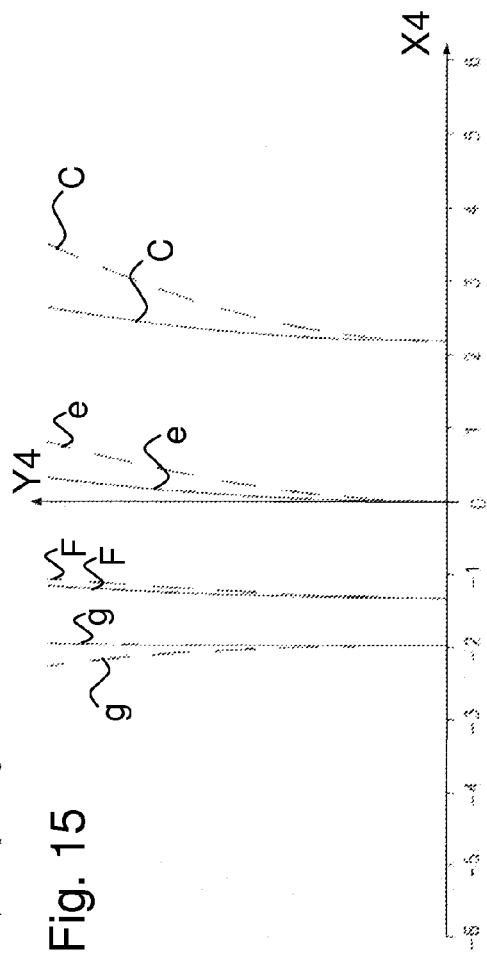
Fig. 14
Fig. 15

IMMERSION OBJECTIVE AND LIGHT MICROSCOPE

The present invention refers in a first aspect to an immersion objective for a light microscope. In a second aspect the invention relates to a light microscope.

A generic immersion objective for a light microscope has the following components: a first lens group arranged on a side of the objective pointing towards a measurement object and in particular comprising a first and a second lens, a third lens arranged behind the first lens group, wherein a first air gap is formed between the first lens group and the third lens, a second lens group arranged behind the third lens and in particular comprising a fourth, fifth and sixth lens, wherein a second air gap is formed between the third lens and the second lens group, and a third lens group arranged behind the second lens group and in particular comprising a seventh, eighth and ninth lens.

A generic light microscope comprises an immersion objective as described above.

Generic objectives are known for example from DE 10 2008 006 826 A1 and from DE 10 2006 052 142 A1. Such objectives are used for example in laser scanning microscopes. Three-dimensional structures of living cells can be observed with them, said cells generally being in a liquid under a cover glass. For three-dimensional observation it is endeavoured to ensure that the refractive indices of the media on both sides of the cover glass are the same as far as possible. In this case particularly sharp images of the specimen at different layer depths, thus different distances along an optical axis of the objective, can be produced. In order that the objective can be suitable for different immersion media, in particular for water, glycerine or oil, the objective of DE 10 2006 052 142 A1 has first and second air gaps which can be adjusted. Such objectives are also described as multi-immersion CORR objectives.

A fundamental requirement of immersion objectives is to provide a high numerical aperture NA, for example $1.05 < NA < 1.2$. In addition the working distance, that is to say the distance between the objective and a specimen, is to be large, for example larger than 0.5 mm with a cover glass thickness of 0.17 mm. This facilitates the handling of the preparations or specimens.

Furthermore a planar apochromatic correction is desirable for the best possible image contrast.

It is known in principle to use for these purposes variable air spaces, additional lenses, cemented elements comprising a plurality of lenses cemented together or particularly thick lenses. However, this leads to an undesirable longer construction length in the direction of the optical axis of the objective. For many microscopes or applications, however, a maximum admissible construction length, for example 48.56 mm, is prescribed. Known multi-immersion CORR objectives which comply with such a limited construction length are subject to an impairment in the performance of the objective. In particular aberrations are only corrected to a limited extent.

The present invention provides an immersion objective which corrects various aberrations as effectively as possible while ensuring compact construction. Furthermore, the present invention provides a light microscope with an immersion objective which effectively corrects different aberrations while having a compact construction.

Advantageous variants of the immersion objective according to the invention are the subject matter of the dependent claims and are also described in the following description, in particular in association with the drawings.

In the case of the immersion objective of the abovementioned type it is provided according to the invention that a tenth, eleventh and twelfth lens are provided behind the third lens group. It is also provided that for the correction of aberrations a fourth air gap is formed between the third lens group and the tenth lens, a fifth air gap is formed between the tenth lens and the eleventh lens and a sixth air gap is formed between the eleventh lens and the twelfth lens. It is further provided that an adjusting device is present to change at least the first, second and fifth air gap for adaptation of optical properties of the objective to an immersion medium.

The light microscope of the aforementioned type comprises according to the invention an immersion objective, wherein behind the third lens group a tenth, eleventh and twelfth lens are provided, wherein for the purpose of correcting aberrations a fourth air gap is formed between the third lens group and the tenth lens, a fifth air gap is formed between the tenth lens and the eleventh lens and a sixth air gap is formed between the eleventh lens and the twelfth lens and wherein, for the adaptation of optical properties of the immersion objective to an immersion medium, an adjusting device for changing at least the first, second and fifth air gap is provided.

Embodiments of the invention provide a comparatively high number of three air gaps between the second lens group and the rearmost lens in the objective. These air gaps act as air lenses and can effectively correct aberrations, in particular a spherical aberration and a longitudinal aberration.

The fifth air gap is designed to be changeable by means of an adjusting device in order to thus be able to adjust the correction of the aberrations for immersion media with different refractive indices. It has hereby been shown to be particularly effective if at least the first, second and fifth air gap can be adjusted independently of each other.

It is advantageously possible with the objective according to the invention to achieve a particularly short construction length of the objective.

Particularly good corrections of aberrations can be achieved in variants of the objective according to the invention, wherein the fourth air gap is in the form of a rearwardly bent meniscus-shaped air lens. The fifth air gap can have the form of a biconcave air lens and the sixth air gap can have the form of a meniscus-shaped air lens bent towards the measurement object.

"Meniscus-shaped" is intended to mean that both surfaces of the lens or air lens in question are bent in the same direction, thus either towards the specimen or away from the specimen. "Forwardly" refers to the direction along the optical axis towards the specimen, whereas "rearwardly" indicates the opposing direction, thus along the optical axis away from the specimen. The meniscus-shaped air lenses can also be described as positive air lenses, whereby "positive" refers solely to the construction form and not to the focal length.

In principle, satisfactory corrections of aberrations can be achieved if any air gap from the fourth, fifth and sixth air gap has the form of a rearwardly bent meniscus-shaped air lens, a further air gap has the form of a biconcave air lens and the remaining air gap has the form of a meniscus-shaped air lens bent towards the object.

The listing of the air gaps and lenses used here, for example the designation of the rearmost lens of the objective as the twelfth lens, is not to be understood in that a corresponding number of air gaps or lenses, for example twelve lenses, must compulsorily be present. Said lenses and lens groups can in principle respectively be replaced by a plurality of lenses or lens groups so long as comparable optical effects are achieved. The objective according to the invention preferably does not contain—besides the lenses and air gaps described here—any further lenses or air gaps.

In order to correct aberrations the optical properties of the air gaps or air lenses are particularly important. These can be described by a value Q which is defined by:

$$Q=|f'|*((2*n1-1)/r1+1/r2)$$

r1 is hereby the radius of curvature of a front surface of the air lens and r2 is the radius of curvature of an opposing rear surface of the air lens. n1 refers to the refractive index of the medium before the front surface of the air lens. On the other hand the refractive index n2 of the medium behind the radius of curvature r2, thus behind the rear surface, defines the focal length f' of the air lens in this following medium.

In case of a negative focal length the air gap has the form of a positive air lens. A positive focal length leads on the other hand to a negative form of the air lens. If Q is negative the air lens is even more greatly bent forwardly as Q increases in value. Inversely, in case of positive Q the air lens is even more greatly bent rearwardly with increasing value of Q. This definition of Q plays a role for the exemplary embodiments in the figures.

An additional third air gap can be present between the second lens group and the third lens group.

In an embodiment of the objective according to the invention the third, fourth and sixth air gap are constant. A cost-effective realisation of the adjusting device is thus possible, which can be adapted in particular exclusively for changing the first, second and fifth air gap. It has been recognised that in the case of the objective according to the invention it is already sufficient to change the aforementioned air gaps in order to achieve very good corrections of aberrations for certain immersion media, in particular for glycerine and oil.

In particular when using a plurality of different immersion media, however, it is useful for the adjusting device to also be adapted to change the third, fourth and sixth air gap. If all air gaps of the objective can be changed by means of the adjusting device the optical properties of the objective can be fittingly adapted to the respectively used immersion medium. For example, water with a numerical aperture of 1.05, glycerine with a numerical aperture of 1.1 and oil with a numerical aperture of for example 1.15 can be used as immersion media. In this embodiment, in case of a change of the immersion medium from water to glycerine and further to oil, the second, fifth and sixth air gap and a seventh air gap located behind the twelfth lens each have a point of inflection, that is to say each of them must once be enlarged and once reduced.

In order to adjust the air gaps, a plurality of frames can be present, which can be mounted in particular telescopically and movable relative to each other in the objective. A first frame may be provided for adjusting the first air gap, with which first frame the third lens, the second lens group, the third lens group and the tenth, eleventh and twelfth lenses are maintained relative to each other, and the adjusting device is adapted to adjust the first frame relative to the first lens group in the direction of the optical axis of the objective. In principle it is already sufficient for adjustment of the first air gap if the third lens can be moved relative to the first lens group using the first frame. More precise mechanical guidance can be achieved, however, if the lenses and lens groups behind the third lens are also held by the first frame.

A second frame is usefully present for adjusting the second air gap, with which second frame at least the second lens group and the third lens group are maintained relative to each other and the adjusting device is adapted to adjust the second frame relative to the third lens in the direction of the optical axis of the objective. The frames may have a cylindrical or funnel-shaped form so that the second frame can be arranged within the first frame. It can be provided in this case that the second frame is moved along with an adjustment of the first frame.

It is further possible to provide a third frame for adjustment of the fifth air gap, with which third frame the eleventh and twelfth lenses can be fixedly maintained relative to each other and the adjusting device can be adapted to adjust the third frame relative to the third lens group in the direction of the optical axis of the objective.

If further air gaps are to be adjustable, further respective frames which can each be moved separately can be provided.

A particularly user-friendly possibility for adjusting the air gaps via the adjusting device is provided if the adjusting device comprises at least one correction ring which is accessible from an outer side of the objective and which can be rotated around the optical axis of the objective. In order to displace the frames along the optical axis upon rotation of the at least one correction ring, in this case the frames are connected by means of gear elements respectively with each one of the correction rings. Markings or engagement points can be present on the objective so that a user can conveniently carry out a certain rotation adjustment for each of the correction rings.

The gear elements can respectively comprise a thread or a cam gear. Mechanical configurations may be used, in which a rotation movement of a correction ring is conveyed into exclusively a linear movement of the associated frame along the optical axis.

In addition or alternatively the adjusting device can comprise piezoelectric actuators, wherein for the displacement of the frames along the optical axis said frames are respectively connected to at least one of the piezoelectric actuators. Particularly space-saving designs are hereby possible which additionally allow particularly rapid displacements of the frames.

In an embodiment of the objective according to the invention, the tenth, eleventh and twelfth lenses are respectively a single lens. By means of single lenses it is advantageously possible, even with a greatly limited construction length of the objective, to provide a comparatively large number of air lenses, through which different aberrations can be effectively corrected. In the case of known generic objectives on the other hand three single lenses are not present behind the third lens group but instead for example two lens groups each comprising two lenses cemented together. As these cemented elements take up more space than single lenses, according to the prior art only two and, and not three, separate lenses can be arranged in this rear part of the objective. Accordingly the effective correction of aberrations according to the invention cannot be achieved.

The aberrations which can be effectively corrected can include in particular spherical aberration, coma, longitudinal aberrations, transverse aberrations, astigmatism, distortion and/or image field curvature.

It was possible to show with simulation calculations that particularly good corrections of aberrations are achieved for different immersion media if the tenth and the eleventh lens are respectively a collective lens and the twelfth lens is a diverging lens. In an embodiment, the tenth lens is a rearwardly bent meniscus lens, the eleventh lens is a forwardly bent meniscus lens and the twelfth lens is a forwardly bent meniscus lens. In principle, instead of meniscus lenses, however, planar concave, biconcave, planar convex or biconvex lenses can also be used.

In order to achieve a high numerical aperture of the objective it is useful that the first lens is a fill lens and that the second lens is a parent lens which directly adjoins the fill lens. The first lens group may be formed exclusively from the first and second lens but can also comprise further lenses.

According to an embodiment the third lens is a collective lens. In particular it can be a rearwardly bent meniscus lens. In principle the lenses described in the different embodiments can also be replaced by lens groups which consist for example of cemented lenses. For a compact construction length of the objective, however, each of the described lenses may be realised through precisely one lens.

It is useful that the second lens group comprises a fourth, fifth and sixth lens which are configured as a triple cemented element, and/or that the third lens group comprises a seventh, eighth and ninth lens which are designed as a triple cemented element. Both the second and the third lens group thereby may have a collective effect.

In particular, in order to achieve a magnification of the objective of 40× it can be provided that the second lens group comprises as a fourth lens a forwardly bent convex-concave lens with a negative refractive power, as a fifth lens a biconvex lens with a positive refractive power and as a sixth lens a rearwardly bent convex-concave lens with a negative refractive power.

The third lens group in this embodiment can comprise as a seventh lens a biconvex lens, as an eighth lens a biconcave lens and as a ninth lens a biconvex lens.

On the other hand, according to another embodiment, in particular in order to achieve a magnification of 63×, the second lens group can comprise as a fourth lens a biconvex lens, as a fifth lens a biconcave lens and as a sixth lens a biconvex lens. The third lens group can be formed here by a forwardly bent convex-concave lens as a seventh lens, a biconvex lens as an eighth lens and a rearwardly bent convex-concave lens as a ninth lens.

The objective according to the invention may be corrected with diffraction limitation on the optical axis in a wavelength range of from approximately 436 nm to 700 nm. The definition brightness is accordingly greater than 81% in a common focus plane.

According to an advantageous embodiment of the light microscope according to the invention a motor is present for driving the adjusting device. The air gaps can thus be conveniently and exactly adjusted. This design is particularly useful if different immersion media are to be used, in the transition of which points of inflection arise in the displacement of the lenses. The motor can be arranged on or in the objective. Alternatively, the motor can be mounted on the light microscope, for example on an objective revolver, so that different objectives can be activated with only one motor. The air gaps can be adjusted in particular in the manner as described in DE 10 2011 002 818 and in DE 10 2008 026 774 A1. The content of these documents is incorporated into the disclosure content of the present text by way of reference thereto.

In the case of a user-friendly variant of the light microscope according to the invention an electronic memory is present, in which settings to be achieved for the adjusting device are stored in dependence upon different immersion media. The settings stored in the electronic memory can be selected via an input device by a user. Furthermore electronic control means can be present to control the motor according to a setting selected by the user. The settings to be reached can be determined experimentally or with simulation calculations and stored in the electronic memory. It can also be provided that the user can store settings which he has carried out himself with the adjusting device via the input device in the electronic memory. In order to select the stored settings, it is possible for either an immersion medium to be directly indicated via the input device or for a refractive index and an Abbe number of an immersion medium to be indicated. A particularly flexible use is facilitated if the electronic control means are adapted to interpolate settings for immersion media with any given refractive indices and Abbe numbers from setting data stored in the electronic memory for certain refractive indices and Abbe numbers of immersion media. It is thereby advantageously possible to use the objective and the light microscope with in principle any desired immersion media.

Further advantages and features of the invention are described below by reference to the attached schematic figures.

FIG. 6 shows a graph of the transverse aberration in dependence upon the sine of the object-side opening angle for an image centre when using glycerine as an immersion medium.

FIG. 7 shows a graph of the transverse aberration in dependence upon the sine of the object-side opening angle for an image height spaced apart from the image centre when using glycerine as an immersion medium.

FIG. 14 is a graph which shows the image height against the astigmatism when using glycerine as an immersion medium for light of differing wavelengths.

FIG. 15 is a graph which shows the image height against the astigmatism when using oil as an immersion medium for light of different wavelengths.

Equivalent components are identified in all the figures with the same reference numerals.

A first embodiment of an immersion objective 100 according to the invention is described by reference to FIGS. 1 and 2.

A light microscope according to the invention comprises the immersion objective 100 according to the invention.

Figure 1:
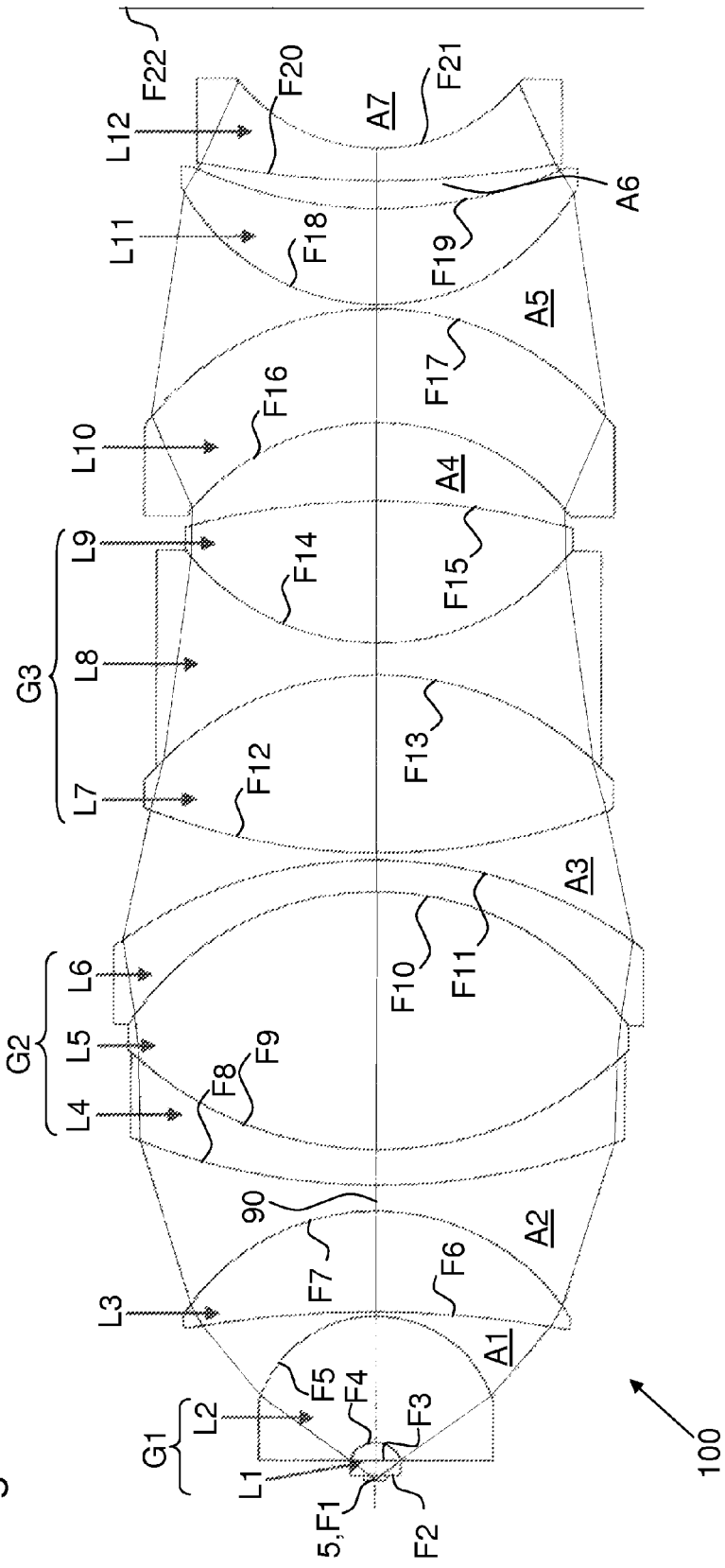
FIG. 1 shows a sectional view of a first embodiment of an objective according to the invention in a first setting.
Figure 2:
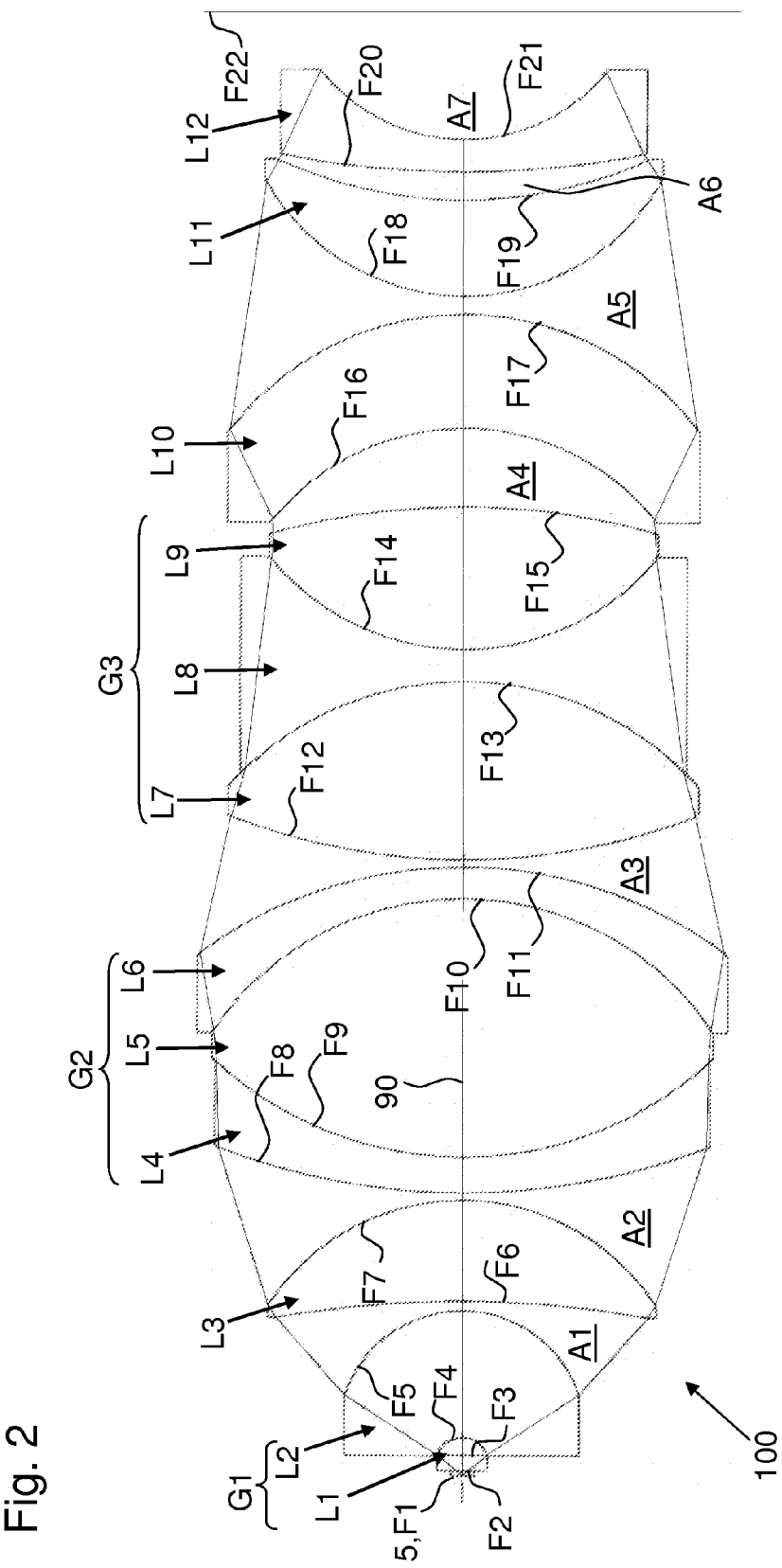
FIG. 2 shows a sectional view of the first embodiment of an objective according to the invention in a second setting.

Twelve lenses are shown as essential components of the objective 100 in FIGS. 1 and 2, said lenses being arranged along the optical axis 90 of the objective 100 and being numbered L1 to L12, from a specimen location to an opposite side of the objective 100. Air gaps A1 to A7 are formed between certain lenses to allow various aberrations to be corrected.

The objective 100 of FIGS. 1 and 2 has a magnification of −40× and a field number of 20. The field number can be defined as the diameter of the object field multiplied by the magnification, whereby it is indicated in millimeters. In this connection the objective 100 is an LD planar apochromatic objective. The LD is the abbreviation for long distance, meaning a long working distance of the objective from the specimen. "Planar" means that the image field has been made planar. Finally, "apochromatic" means that the focus positions of light of various wavelengths coincide, namely light of the spectral line "e" with a wavelength of 546.07 nm, "C" with 643.85 nm, "F" with 479.99 nm and "g" with 435.83 nm. These spectral lines are often indicated with apostrophes in the literature, for example C' instead of C. In the present case the abovementioned wavelengths are to apply.

According to the invention certain lenses or lens groups are displaced. Air gaps hereby change, whereby the air gaps can be adjusted to correct aberrations for a respectively used immersion medium. In FIG. 1 glycerine is used as an immersion medium, while in FIG. 2 oil is used. In order to adjust the imaging properties of the objective 100 to the respective immersion medium, the air gaps A1, A2 and A5 can be changed independently of each other. In FIG. 1 a first adjustment has been carried out for these three air gaps, whereas in FIG. 2 a different second adjustment has been made.

The optical components of the objective 100 are described in detail below. On the optical axis 90 there is a measurement object 5 at a specimen location. Said measurement object 5 can be for example a living cell in an aqueous solution. A cover glass 6 connects to the measurement object 5 on a surface F1. The cover glass 6 ends with a planar surface F2, on which an immersion medium 7 is to be provided. In the case of FIG. 1 this is therefore glycerine and in the case of FIG. 2 it is oil.

A first lens L1 of the objective 100 is adjacent to the immersion medium 7. The first lens L1 is a positive fill lens, that is to say a fill lens with a positive refractive power, which is adjacent, with a planar surface F3, to the immersion medium 7 and, with an opposing surface F4, is in direct contact with a second lens L2 which is a parent lens with a negative refractive power. The first and second lenses L1, L2 are cemented to each other and thus form a first cemented element or a first lens group G1.

The second lens L2 ends with a surface F5, which is followed by a third lens L3. A first air gap A1 is left between the surface F5 of the second lens L2 and a surface F6 of the third lens L3. The third lens L3 is a meniscus lens with a positive refractive power, whereby the centres of curvature of its two surfaces F6 and F7 lie on the side facing the measurement object 5.

A second lens group G2 follows the third lens L3. Said second lens group G2 consists of three lenses cemented to each other, namely a fourth lens L4, a fifth lens L5 and a sixth lens L6. A second air gap A2 is formed between the surface F7 of the third lens L3 and a surface F8 of the fourth lens L4. The fourth lens L4 has a negative refractive power, wherein the centres of curvature of its two surfaces F8 and F9 lie on the side facing away from the measurement object 5. The surface 9 is shared by the fourth lens L4 with the fifth lens L5 which is a biconvex lens with a positive refractive power. The sixth lens L6 connects directly to a rear surface F10 of the fifth lens, said sixth lens L6 having a negative refractive power, and wherein the centres of curvature of both surfaces F10 and F11 lie on the side of the measurement object 5.

A third lens group G3 follows the second lens group G2, whereby a third air gap A3 is left between them. The third lens group G3 consists of a seventh lens L7, an eighth lens L8 and a ninth lens L9 which are cemented to each other. The seventh lens L7 is a biconvex lens with a positive refractive power and comprises the surfaces F12 and F13. Said seventh lens L7 shares the surface F13 with the eighth lens L8 which has a biconcave form and thus a negative refractive power. The ninth lens L9 connects directly to the rear surface F14 of the eighth lens L8, said ninth lens L9 having a biconvex form and thus a positive refractive power. A fourth air gap A4 follows a rear surface F15 of the ninth lens L9 to a tenth lens L10.

The tenth lens L10 is a meniscus lens with a positive refractive power, wherein the centres of curvature of its two surfaces F16 and F17 lie on the side of the measurement object 5.

A fifth air gap A5 follows the surface F17 to an eleventh lens L11 which is also a meniscus lens with a positive refractive power. The centres of curvature of its two surfaces F18 and F19 lie, however, on the side of the image, thus on the side of the lens facing away from the measurement object 5.

There is a twelfth lens L12 behind the eleventh lens L11, whereby a sixth air gap A6 is in turn left between them. The twelfth lens L12 is a meniscus lens with a negative refractive power, whereby the centres of curvature of its two surfaces F20 and F21 lie on the side of the image.

The objective can end with the surface F21 of the twelfth lens L12 or a closing diaphragm with the surface F22 can be present.

A so-called Infinite Colour Correction System (ICCS) is provided with the objective according to the invention. The image is hereby projected into infinity and only a tube lens produces an intermediate image.

The three air gaps A4, A5 and A6 are particularly important, whereby the forms thereof are determined by the adjacent lenses and through which the different aberrations can be effectively corrected not for a certain immersion medium but instead equally for different immersions. These three air gaps serve as air lenses, wherein the fourth air gap A4 has the form of a meniscus bent towards the image side, the fifth air gap A5 has the form of a biconcave air lens and the sixth air gap A6 has the form of a meniscus lens bent towards the measurement object 5. Through these three air lenses and through the three single lenses L10, L11 and L12 for forming these air lenses, the necessary construction space, that is to say the expansion of the objective 100 in the direction of the optical axis 90, is kept low, but whereby spherical aberration, coma and longitudinal aberrations can still be effectively corrected and errors of a greater magnitude can be compensated.

The optical properties of the air lenses A4, A5 and A6 can be indicated via the value Q, which has been defined above, and the focal length f in the medium which follows the respective air lens. Q and f have the following values in the first embodiment:

| | | |
|---|---|---|
| Air lens A4: | Q(A4) = −4.6 | f(A4) < 0 |
| Air lens A5: | Q(A5) = −1.4 | f(A5) > 0 |
| Air lens A6: | Q(A6) = +18.7 | f(A6) < 0 |

The exact forms of the lenses L1 to L12 and the resulting values of the air gaps A1 to A7, measured on the optical axis 90, are indicated in Table 1 below.

TABLE 1

| Surface | Radius | Thickness | $n_e$ | $v_e$ |
|---|---|---|---|---|
| F1 | Planar | 0.170 | 1.526 | 54.3 |
| F2 | Planar | 0.525 | Glycerine/oil | |
| F3 | Planar | 0.620 | 1.489 | 70.2 |
| F4 | −0.9180 | 4.335 | 1.888 | 40.5 |
| F5 | −4.1570 | A1 | | |
| F6 | −35.5630 | 3.480 | 1.440 | 94.6 |
| F7 | −7.7170 | A2 | | |
| F8 | 22.2250 | 1.230 | 1.641 | 42.2 |
| F9 | 12.0575 | 9.000 | 1.530 | 76.6 |
| F10 | −9.9990 | 1.100 | 1.641 | 42.2 |
| F11 | −14.6420 | 0.250 (A3) | | |
| F12 | 20.9822 | 6.200 | 1.498 | 81.1 |
| F13 | −10.4410 | 1.100 | 1.641 | 42.2 |
| F14 | 8.2920 | 4.900 | 1.440 | 94.6 |
| F15 | −24.2344 | 2.713 (A4) | | |
| F16 | −8.1756 | 3.900 | 1.855 | 23.7 |
| F17 | −9.8580 | A5 | | |
| F18 | 7.6060 | 3.280 | 1.597 | 35.0 |
| F19 | 14.7470 | 0.960 (A6) | | |
| F20 | 31.6240 | 1.100 | 1.725 | 34.5 |
| F21 | 6.1313 | 2.500 (A7) | | |
| F22 | Planar | 126.50 | | |

In the first column of the table the surfaces F1 and F2 of the cover glass, the surfaces F3 to F21 of the lenses L1 to L12 and the closing surface F22 are indicated. In the next column the radii of curvature of the surfaces are indicated in millimeters. A negative number thereby indicates that the curvature or circular mid-point of the respective surface lies on the side towards the measurement object 5, while in case of a positive number the mid-point of the curvature lies on the image side, thus the side of the respective surface facing away from the measurement object 5. The next column "thickness" represents the distance from the next surface, whereby the distance is determined in the direction of the optical axis 90 and indicated in millimeters. For example a "thickness" of 9.0 millimeters for the surface F9 indicates that the distance from the surface F9 to the surface F10 measured on the optical axis is 9.0 mm.

In the next column "$n_e$", the refractive index of the respective medium for light with a wavelength of the e-line of mercury, that is to say 546.07 nm, is indicated.

The last column "$v_e$" indicates the Abbe number of the respective medium. The Abbe number is a value for the dispersion of the medium and can be defined via the refractive indices for light of differing wavelengths as $v_e=(n_e-1)/(n_F-n_c)$, wherein $n_e$ is the refractive index at 546.07 nm, $n_F$ is the refractive index at 479.99 nm and $n_c$ the refractive index at 643.85 nm. The medium is observed for the refractive index and the Abbe number on the image side of the respective surface, in the series of the surface F8 thus the medium between the surface F8 and F9 and thus the fourth lens L4.

A tube lens (not shown) with a focal length of 164.5 mm connects to the surface F22 in the embodiments shown.

The refractive index and the Abbe number for the medium behind the surface F2 depend upon the immersion medium used. For the first embodiment of FIGS. 1 and 2, wherein solely the air gaps A1, A2 and A5 are changed, in particular glycerine and oil are suited as immersion media. In the embodiment described, glycerine with a refractive index of $n_e=1.456$ and an Abbe number of $v_e=59.6$ is used. The oil used has a refractive index of $n_e=1.518$ and an Abbe number of $v_e=47.1$ This results in the values indicated below for the numerical aperture, the magnification and the field number of the objective 100.

| Glycerine as immersion medium | Oil as immersion medium |
|---|---|
| Numerical aperture = 1.15 | Numerical aperture = 1.2 |
| Magnification = −39.5 | Magnification = −40.3 |
| Field number = 20 | Field number = 20 |

Numerical values in millimeters of the thicknesses or widths of the variable air gaps A1, A2 and A5 can be seen from the following Table 2. Suitable thicknesses of these air gaps are thereby indicated when using glycerine as an immersion medium, corresponding to the setting shown in FIG. 1, and also when using oil as an immersion medium, corresponding to the setting indicated in FIG. 2.

TABLE 2

| Air gap | Glycerine | Oil |
|---|---|---|
| A1 | 0.150 | 0.337 |
| A2 | 0.897 | 0.250 |
| A5 | 0.150 | 0.609 |

Figure 3:
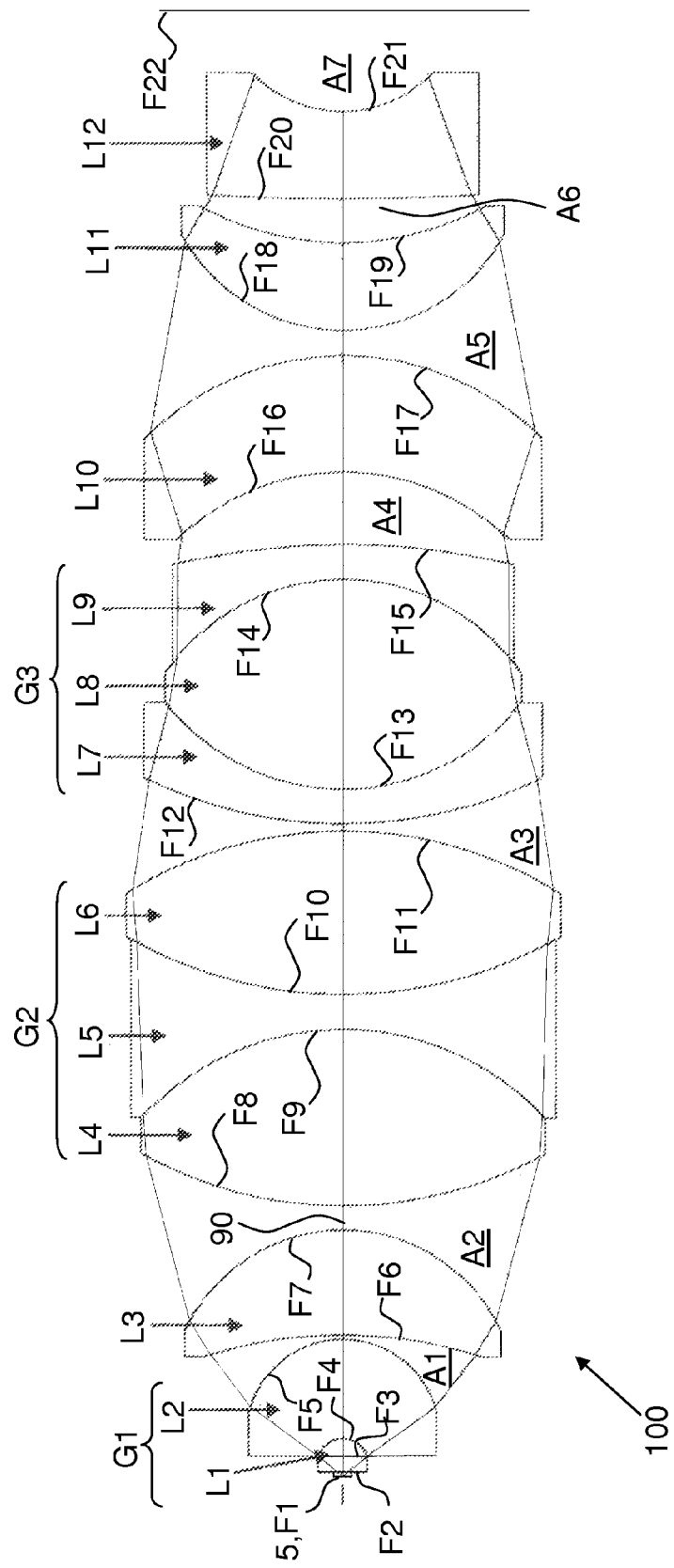
FIG. 3 shows a sectional view of a second embodiment of an objective according to the invention in a first setting.
Figure 4:
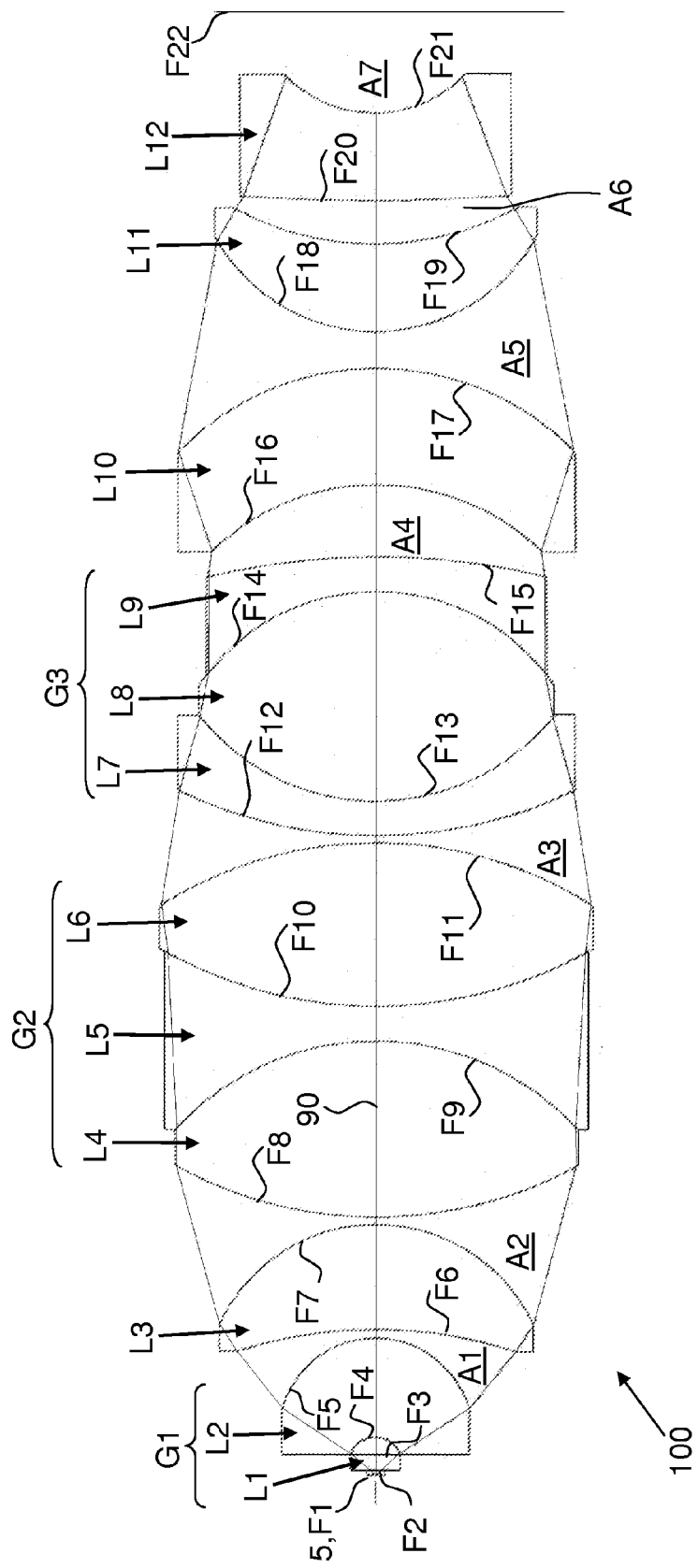
FIG. 4 shows a sectional view of the second embodiment of an objective according to the invention in a second setting.

A second embodiment of an objective 100 according to the invention is shown in FIGS. 3 and 4. FIG. 3 thereby shows a first setting of this objective 100 for a use with glycerine as an immersion medium, whereas FIG. 4 shows a second setting of the same objective 100 for a use with oil as an immersion medium.

In contrast with the embodiment of FIGS. 1 and 2 described above, this objective 100 has a magnification of −63×. The structure of this objective 100 differs from that of the previously described objective essentially through the differences described below.

In this second embodiment the second lens group G2 is a triple cemented element comprising a fourth lens L4, a fifth lens L5 and a sixth lens L6. The fourth lens L4 and the sixth lens L6 are thereby biconvex lenses, while the fifth lens L5 lying between them is a biconcave lens.

The third lens group G3 is formed by the seventh lens L7, the eighth lens L8 and the ninth lens L9. The seventh lens L7 has a negative refractive power, whereby its two surfaces are bent towards the measurement object. The eighth lens L8 has a biconvex form and correspondingly a positive refractive power. The ninth lens L9, finally, has a negative refractive power, whereby its two surfaces F14 and F15 are bent towards the image side.

In addition this second embodiment differs from the first embodiment described by reference to FIGS. 1 and 2 in the concrete numerical values for the radii of curvature of the respective surfaces, the thicknesses of the lenses L1 to L12, the size of the spaces A1 to A7 between the lenses, the refractive indices and the Abbe numbers of the lenses. The values for these are indicated in the following Table 3.

TABLE 3

| Surface | Radius | Thickness | $n_e$ | $v_e$ |
|---|---|---|---|---|
| F1 | Planar | 0.170 | 1.526 | 54.3 |
| F2 | Planar | 0.525 | Glycerine/oil | |

TABLE 3-continued

| Surface | Radius | Thickness | $n_e$ | $v_e$ |
|---|---|---|---|---|
| F3 | Planar | 0.620 | 1.489 | 70.2 |
| F4 | −0.9118 | 3.400 | 1.888 | 40.5 |
| F5 | −3.3718 | A1 | | |
| F6 | −15.7072 | 3.600 | 1.440 | 94.6 |
| F7 | −6.0499 | A2 | | |
| F8 | 14.4400 | 6.100 | 1.498 | 81.1 |
| F9 | −9.4912 | 1.200 | 1.617 | 44.3 |
| F10 | 14.9730 | 5.700 | 1.498 | 81.1 |
| F11 | −13.9874 | 0.250 (A3) | | |
| F12 | 15.5391 | 1.200 | 1.617 | 44.3 |
| F13 | 7.7864 | 7.300 | 1.440 | 94.6 |
| F14 | −7.4483 | 1.200 | 1.617 | 44.3 |
| F15 | −25.4777 | 2.500 (A4) | | |
| F16 | −8.2694 | 4.000 | 1.855 | 23.7 |
| F17 | −9.7328 | A5 | | |
| F18 | 6.3963 | 3.000 | 1.597 | 35.0 |
| F19 | 10.3492 | 1.500 (A6) | | |
| F20 | 72.7369 | 2.984 | 1.725 | 34.5 |
| F21 | 4.3945 | 1.500 (A7) | | |
| F22 | Planar | 126.50 | | |

As previously, the air gaps here, A1, A2 and A5, are also variable, while the remaining air gaps are unchangeable. The following Table 4 shows the values of the air gaps A1, A2 and A5 for the immersion medium glycerine, thus the setting shown in FIG. 3, and oil, thus the setting shown in FIG. 4. The indications are given in millimeters.

TABLE 4

| Air gap | Glycerine | Oil |
|---|---|---|
| A1 | 0.150 | 0.300 |
| A2 | 0.818 | 0.250 |
| A5 | 0.857 | 1.259 |

For the air lenses A4, A5 and A6, the following numerical values for Q and for the focal length f are thus fixed:

| Air lens A4: | Q(A4) = −5.3 | f(A4) < 0 |
| Air lens A5: | Q(A5) = −1.1 | f(A5) > 0 |
| Air lens A6: | Q(A6) = +8.3 | f(A6) < 0 |

The numerical aperture, the magnification and the field number of the objective 100 thus have the following values:

| Glycerine as immersion medium | Oil as immersion medium |
|---|---|
| Numerical aperture = 1.15 | Numerical aperture = 1.2 |
| Magnification = −62.3 | Magnification = −63.7 |
| Field number = 20 | Field number = 20 |

In general, the following values apply for the properties of the three air lenses A4, A5 and A6 for both the embodiments described above by reference to FIGS. 1 to 4:

| Air lens A4: | −5.3 < Q(A4) < −3.8 | f(A4) < 0 |
| Air lens A5: | −1.5 < Q(A5) < −1.1 | f(A5) > 0 |
| Air lens A6: | +8.3 < Q(A6) < +20.2 | f(A6) < 0 |

In both these embodiments the optical properties of the objective 100, thus the correction of aberrations, can be adjusted very well for the immersion media glycerine and oil. In this connection solely the air gaps A1, A2 and A5 are changed. This can be achieved in a mechanically cost-effective manner by means of a multi-immersion CORR objective with correction rings, through which the lenses can be displaced by means of thread elements. Good results can indeed also be achieved for water as an immersion medium, but the air gaps hereby have points of inflection in case of changes between the three immersion media. This means that more complex mechanical mechanisms are necessary for adjustment of the air gaps.

Even further improvements in the imaging quality are possible if additional air gaps can be variably adjusted. In an embodiment which is not shown, all air gaps A1 to A7 can be adjusted. In particular it is also hereby possible to correct numerous aberrations if water is used as an immersion medium. This embodiment equates to the first embodiment shown in FIGS. 1 and 2 having regard to the number of lenses, their arrangement relative to each other and their qualitative form, that is to say the sign (+ or −) of the radii of curvature of the surfaces F1 to F22. The concrete numerical values of the radii of curvature and the thicknesses of the lenses differ, however, and are indicated in the following table.

TABLE 5

| Surface | Radius | Thickness | $n_e$ | $v_e$ |
|---|---|---|---|---|
| F1 | Planar | 0.170 | 1.526 | 54.3 |
| F2 | Planar | 0.520 | Water/glycerine/oil | |
| F3 | Planar | 0.620 | 1.489 | 70.2 |
| F4 | −0.9180 | 4.154 | 1.888 | 40.5 |
| F5 | −3.9646 | A1 | | |
| F6 | −32.5459 | 4.305 | 1.440 | 94.6 |
| F7 | −8.1620 | A2 | | |
| F8 | 21.7451 | 1.200 | 1.641 | 42.2 |
| F9 | 11.7108 | 8.900 | 1.530 | 76.6 |
| F10 | −10.0278 | 1.200 | 1.641 | 42.2 |
| F11 | −14.3023 | A3 | | |
| F12 | 19.5484 | 5.500 | 1.498 | 81.1 |
| F13 | −10.0183 | 1.200 | 1.641 | 42.2 |
| F14 | 8.1905 | 4.600 | 1.440 | 94.6 |
| F15 | −31.8360 | A4 | | |
| F16 | −8.0989 | 4.000 | 1.855 | 23.7 |
| F17 | −9.7667 | A5 | | |
| F18 | 7.6482 | 3.100 | 1.597 | 35.0 |
| F19 | 14.6433 | A6 | | |
| F20 | 30.0811 | 1.200 | 1.725 | 34.5 |
| F21 | 6.1388 | A7 | | |
| F22 | Planar | 126.50 | | |

In this embodiment the air gaps A1 to A7 are respectively adjusted in dependence upon the immersion medium used. The following Table 6 shows the sizes of these air gaps in millimeters in dependence upon the immersion media: water, glycerine and oil.

TABLE 6

| Air gap | Water | Glycerine | Oil |
|---|---|---|---|
| A1 | 0.122 | 0.184 | 0.368 |
| A2 | 0.354 | 0.633 | 0.060 |
| A3 | 0.250 | 0.953 | 1.036 |
| A4 | 3.313 | 2.677 | 2.600 |
| A5 | 0.595 | 0.200 | 0.574 |
| A6 | 1.000 | 1.056 | 1.054 |
| A7 | 2.257 | 2.188 | 2.198 |

In the case of transition from water to glycerine and further to oil, the air gaps A2, A5, A6 and A7 have a point of inflection. In case of a change from water to glycerine for example the gap A2 is to be enlarged, but in case of a change from glycerine to oil it must be reduced. In order to be able to carry out these adjustments conveniently and with low time resources, a motor may be used for this embodiment to adjust the air gaps.

The following values of Q and the focal length f result for the air lenses A4, A5 and A6 from the abovementioned numerical values:

| Air lens A4: | Q(A4) = −3.8 | f(A4) < 0 |
| Air lens A5: | Q(A5) = −1.5 | f(A5) > 0 |
| Air lens A6: | Q(A6) = +20.2 | f(A6) < 0 |

The indications for Q and f given with this third embodiment for the air lenses A4 to A6 can be summarised generally with the indications for Q and f of the two embodiments described above. These result in the ranges for Q and f which are mentioned after Table 4 and the indications concerning the immersion media. Through these ranges therefore a uniform property of the air lenses A4 to A6 is expressed, which is valid for all three described embodiments.

The refractive indices and Abbe numbers of glycerine and oil correspond in the third embodiment to the previously indicated values. The water used in this embodiment has a refractive index of $n_e$=1.334 and an Abbe number of $v_e$=55.9.

The numerical aperture, the magnification and the field number of the objective thereby assume the following values in dependence upon the different immersions:

| | Immersion: | | |
| --- | --- | --- | --- |
| | Water | Glycerine | Oil |
| Numerical aperture: | 1.05 | 1.10 | 1.15 |
| Magnification: | −40.3 | −39.7 | −40.4 |
| Field number: | 20 | 20 | 20 |

In dependence upon the requirements for the correction of aberrations the values indicated in the Tables 1 to 6 can deviate by up to 5% from the respective value. Preferable, however, are embodiments in which the values do not deviate by more than 2% and particularly preferable are those in which the values do not deviate by more than 0.5% from the respective numerical value.

Figure 5:
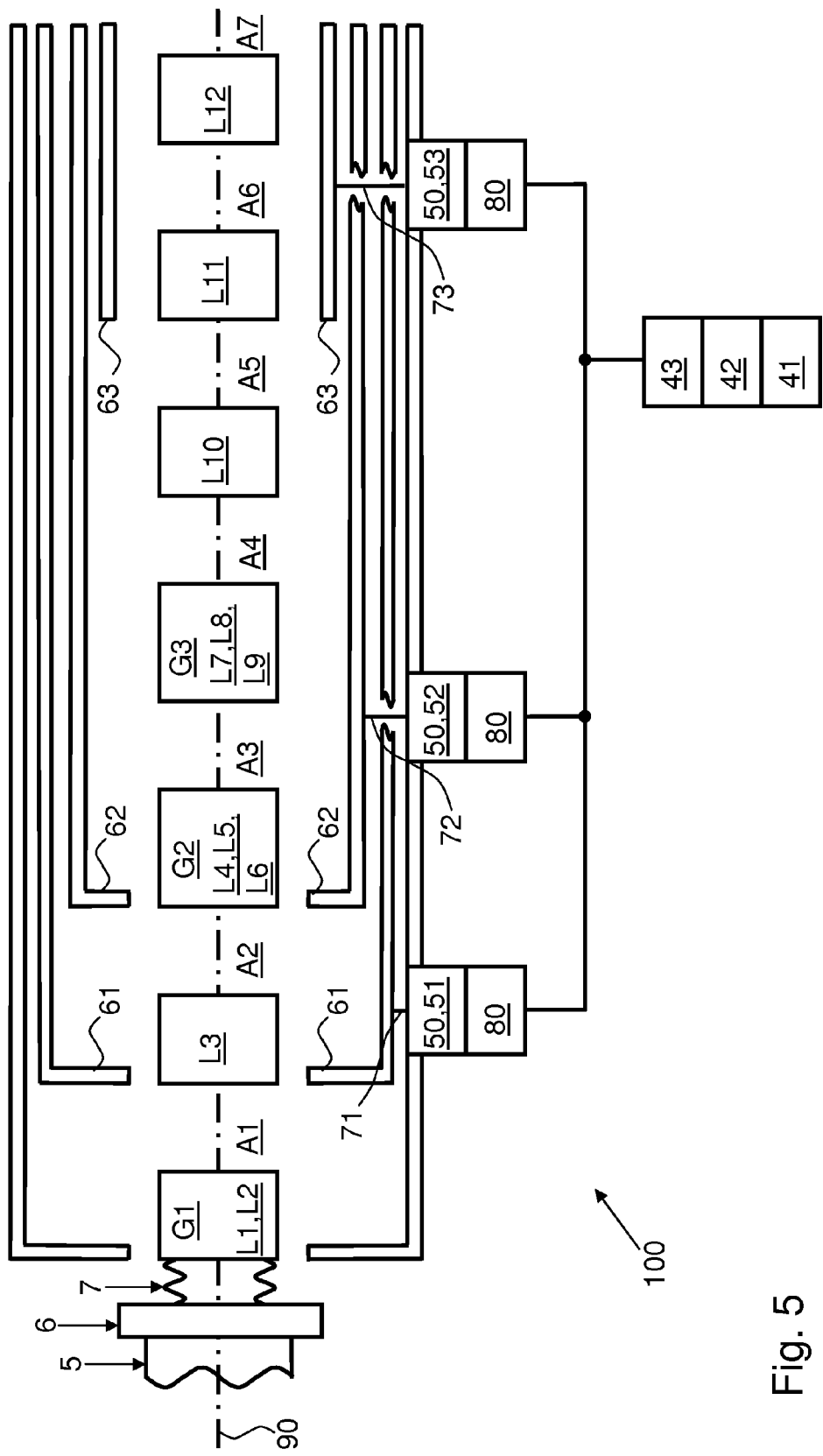
FIG. 5 shows a schematic view of a further embodiment of an objective according to the invention.

A schematic view of a further exemplary embodiment of an immersion objective 100 according to the invention is shown in FIG. 5. This comprises twelve lenses L1 to L12 which can be formed with any given one of the previously described embodiments.

The lenses L1 to L12 are in turn arranged along the optical axis 90 whereby a specimen 5 is also shown which is arranged between an object carrier or a specimen container and a cover glass 6. An immersion medium 7 is provided between the cover glass 6 and the first lens L1, whereby this can for example be water, glycerine or oil.

Furthermore FIG. 5 shows media for adjusting certain air gaps. Furthermore a plurality of frames 61, 62, 63 are present, in which certain lenses are respectively held. By adjusting the frames 61, 62, 63 along the optical axis 90, the lenses held by the frames and thus certain air gaps are adjusted.

In the case shown, three frames 61, 62, 63 are present, with which three air gaps A1, A2 and A5 can be adjusted. Further frames can, however, also be present in order to change other air gaps, in particular all the air gaps A1 to A7.

By displacing the first frame 61, the third lens L3 is moved relative to the lens group G1 in fixed location in the objective 100, whereby the first air gap A1 changes. As is also the case in the variant shown, when the first frame 61 is moved further lenses arranged behind the third lens L3 are also moved.

The second frame 62 is fixedly connected to the second lens group G2 and may also be connected to further lenses located behind the lens group G2. In particular the third lens group G3 and the tenth, eleventh and twelfth lens L10, L11, L12 can also be held in the second frame. The second frame 62 can be moved relative to the first frame 61 and thus relative to the third lens L3, whereby the second air gap A2 can be adjusted.

Finally, the third frame 63 is fixedly connected to the eleventh lens L11 and the twelfth lens L12 and can be moved relative to the remaining frames 61, 62. The fifth air gap A5 can hereby be adjusted.

For changing the position of the three frames 61, 62, 63, an adjusting device 50 is present. In the embodiment shown, this comprises three correction rings 51, 52, 53, of which each is respectively connected to one of the frames 61, 62, 63 via gear elements 71, 72, 73. The correction rings 51, 52, 53 are accessible from an outer side of the objective 100 for a user. If the user turns one of the correction rings 51, 52, 53, this causes, via the associated gear elements 71, 72, 73, a linear movement of the corresponding frame 61, 62, 63 along the optical axis 90.

In order to simplify the adjustment for a user, engagement points for the correction rings 51, 52, 53 can be provided. The engagement points thereby correspond to appropriate adjustments for different immersion media, such as indicated for example in the Tables 2, 4 and 6.

The positions of the frames 61, 62, 63 can be set particularly exactly if a motor 80 is present for this purpose. In the example shown, a plurality of motor units 80 can actuate the different correction rings 51, 52, 53. Alternatively the motor units 80 can also be directly connected via the gear elements 71, 72, 73 to the frames 61, 62, 63.

In order to control the motor 80, electronic control means 43 are present. These can be located in the light microscope, on which the objective 100 is to be arranged, or accommodated in an additional housing. In addition an electronic memory 42 is present, in which position settings of the frames 61, 62, 63 for different immersion media are stored.

Alternatively or additionally, the structure of the frames 61, 62, 63, of the adjusting device 50, in particular of the correction rings 51, 52, 53, and/or of the motor 80 can take place as described in DE 10 2011 002 818 or in DE 10 2008 026 774 A1.

Finally an input device 41 is present which can be formed for example by a keyboard or a touch screen. By means of the input device 41 a user can indicate which immersion medium is used. According to this input the electronic control means 43 loads the data stored for the immersion medium in the electronic memory 42 and hereby adjusts the positions of the frames 61, 62, 63 via the motor 80.

The transmission of control signals between the electronic control means 43 and the motor 80 and/or the energy supply of the motor 80 can take place for example via cable, via radio waves or via modulated light waves.

The system of lenses L1 to L12 as used and the intermediately lying variable air lenses are particularly suited to facilitate good corrections of aberrations for different immersion media. Graphs with value indications for the correction of different aberrations are indicated in FIGS. 6 to 15. These indications are based upon optical images which can be produced with the objectives according to the above-described embodiments.

FIGS. 6 to 9 show graphs of the transverse aberration in dependence upon the sine of the object-side opening angle entered on the x-axis X1. The transverse aberration for light of different wavelengths is indicated, whereby "C" refers to light with 643.85 nm wavelength, "F" for 479.99 nm, "g" for 435.83 nm and "e" for 546.07 nm. "$e_s$" identifies the transverse aberration for light with a wavelength of 546.07 nm spreading in the sagittal plane, while the remaining indications relate to the meridional plane perpendicular to the sagittal plane. A scale mark indicates a transverse aberration of 0.10 mm on the y-axis Y1.

Figure 8:
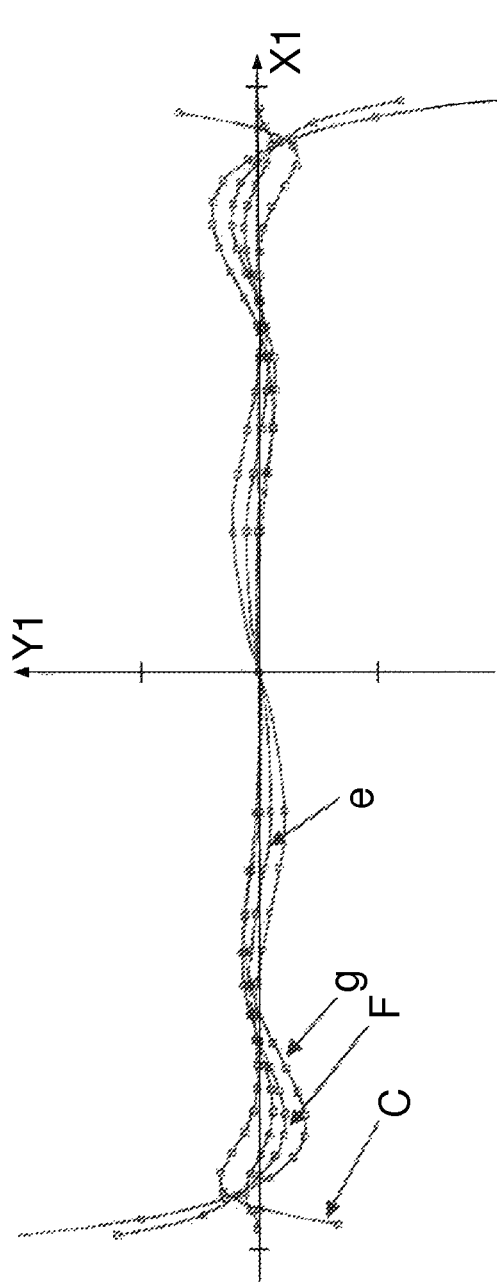
FIG. 8 shows a graph of the transverse aberration in dependence upon the sine of the object-side opening angle for an image centre when using oil as an immersion medium.
Figure 9:
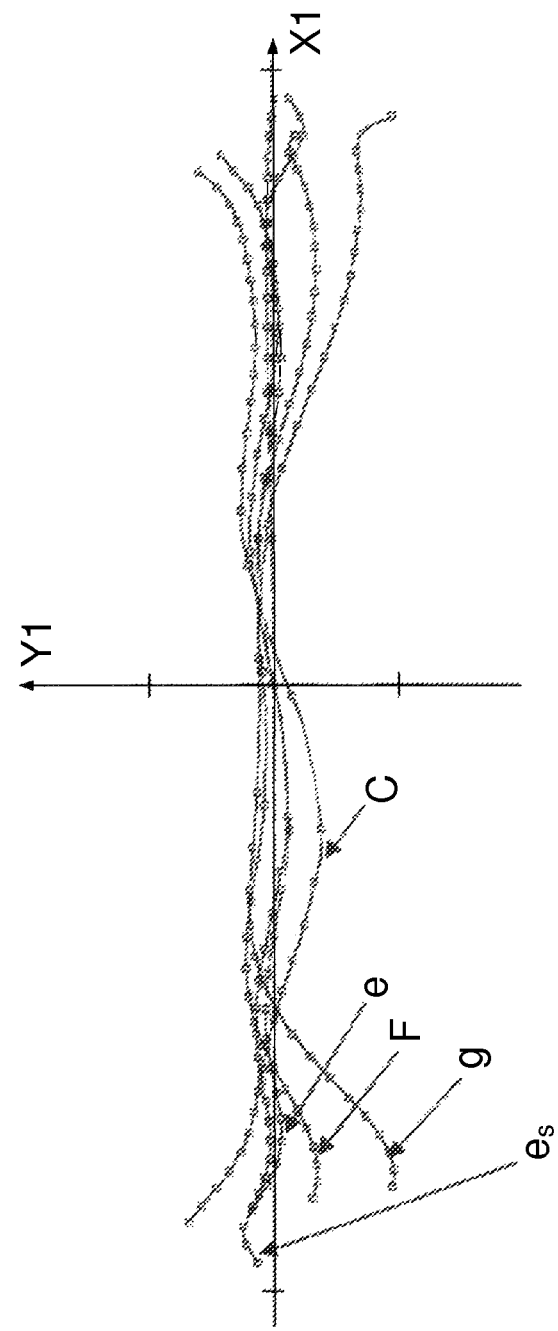
FIG. 9 shows a graph of the transverse aberration in dependence upon the sine of the object-side opening angle for an image height spaced apart from the image centre when using oil as an immersion medium.

FIGS. 6 and 7 use the immersion medium glycerine while oil is used as immersion medium in FIGS. 8 and 9.

FIGS. 6 and 8 refer to ray paths in relation to an image height of zero, that is to say a point in the middle of the image on the optical axis is observed. In FIGS. 7 and 9 on the other hand the image height is spaced apart from the middle of the image, by 10 mm here.

It can be seen from FIGS. 6 to 9 that the transverse aberration has been corrected very well up to very large x-axis values. This is applicable to extensively the whole visible wavelength range. In addition a very good correction can also be achieved even with greater image heights.

FIGS. 10 to 15 show graphs for further aberrations.

The y-axis Y2, Y3, Y4 respectively corresponds to the image height observed. The intersection point with the x-axis X2, X3, X4 indicates an image height of zero, thus lying on the optical axis.

Figure 10:
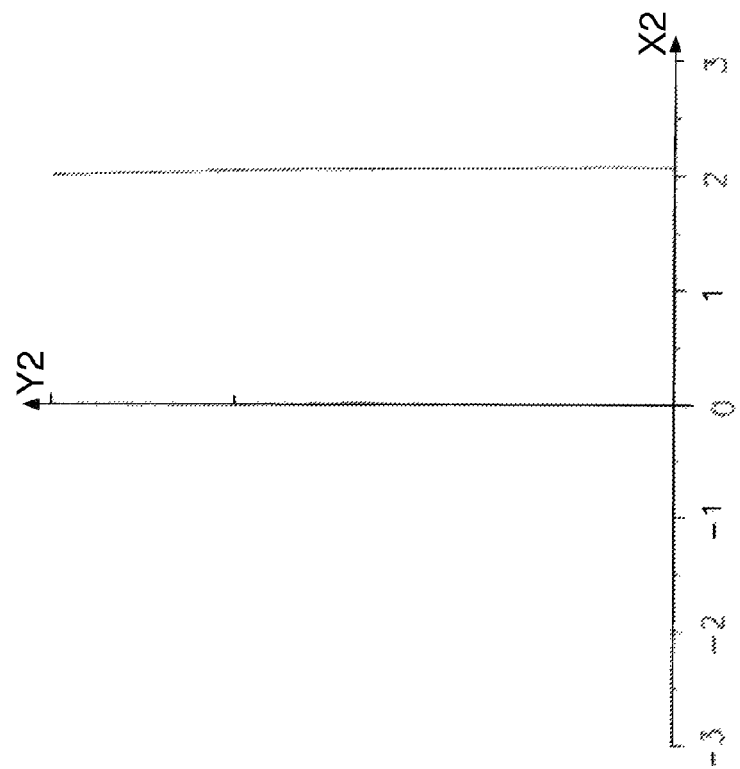
FIG. 10 is a graph which shows the image height against the chromatic magnification difference when using glycerine as the immersion medium.
Figure 11:
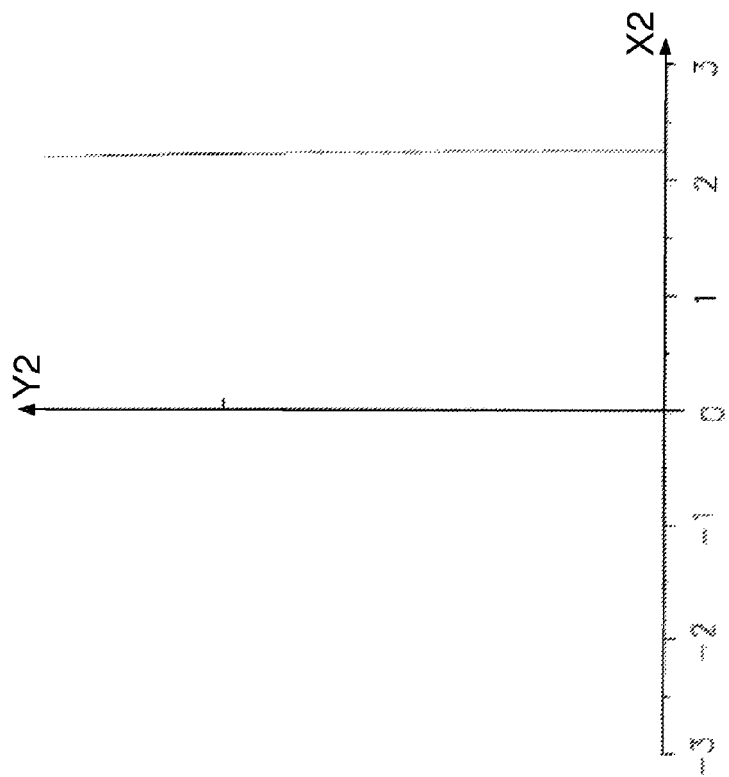
FIG. 11 is a graph which shows the image height against the chromatic magnification difference when using oil as an immersion medium.

On the x-axis X2 the chromatic magnification difference is indicated in FIGS. 10 and 11 in promille. The chromatic magnification difference results from the dispersion and is defined as the difference between the magnifications for light of the spectral line "F" with 479.99 nm and the spectral line "C" with 643.85 nm, whereby this difference is divided by the magnification in the reference wavelength 546.07 nm of the spectral line "e". In the present case the difference between the magnification when using green light and when using red light is thus formed and subsequently divided by the magnification in case of green light.

While in FIG. 10 glycerine was used for immersion, oil was used as immersion in FIG. 11. In both cases the figures show that the relative chromatic magnification difference for large image heights does not increase or hardly increases. This aberration is thus corrected via extensively the whole field of vision.

Figure 13:
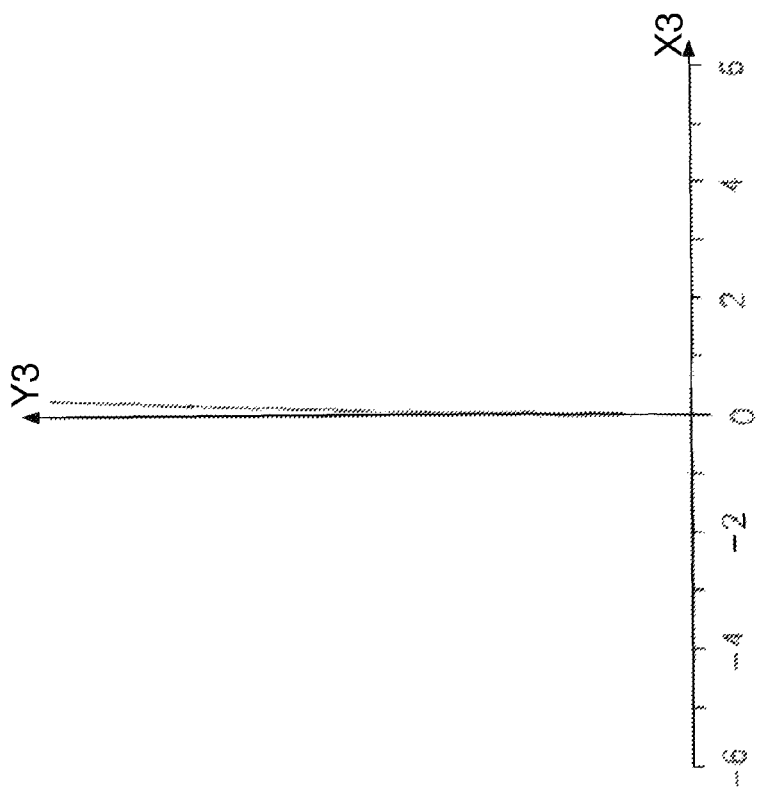
FIG. 13 is a graph which shows the image height against the distortion when using oil as an immersion medium.
Figure 12:
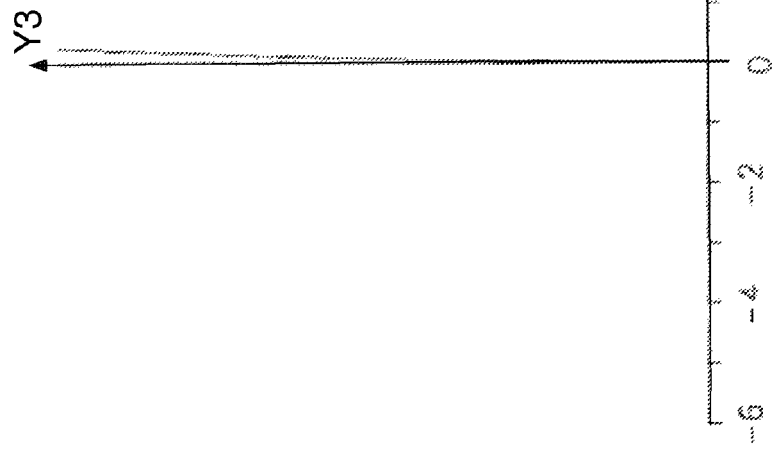
FIG. 12 is a graph which shows the image height against the distortion when using glycerine as an immersion medium.

The x-axis X3 in FIGS. 12 and 13 indicates the distortion in percent. In FIG. 12 glycerine is in turn used as the immersion medium and oil in FIG. 13. The figures indicate that the distortion is clearly lower than 1% even with great image heights.

In FIGS. 14 and 15, finally, the astigmatism is entered on the x-axis X4 in [R.E.], i.e. Rayleigh Units, against the image height Y4. The astigmatism for light rays extending in the sagittal plane is thereby shown as a solid line and for light rays extending in the tangential or meridional line as a broken line. The astigmatism is wavelength-dependent and is indicated for light rays "e" with 546.07 nm wavelength, "C" with 643.85 nm, "F" with 479.99 nm and "g" with 435.83 nm. It can be seen that within the visible light range the astigmatism is only weak even with great image heights.

A multitude of aberrations is thus effectively corrected with the light microscope according to the invention and with the immersion objective according to the invention. This can advantageously take place for different immersion media in that certain air gaps are changed between the lenses of the objective. At the same time the construction length of the objective can be kept short. It is particularly significant for this that the rear end of the objective ends with three individual lenses.

LIST OF REFERENCE NUMERALS

5 Measurement object
6 Cover glass
7 Immersion medium
41 Input device
42 Electronic memory
43 Electronic control means
50 Adjusting device
51, 52, 53 Correction rings
61, 62, 63 First, second, third frame
71, 72, 73 Gear elements
80 Motor
90 Optical axis
100 Immersion objective
L1-L12 Lenses
G1-G3 Lens groups
A1-A7 Air gaps
F1-F22 Surfaces

The invention claimed is:

1. An immersion objective for a light microscope,
having a first component including a lens group which is arranged on a side of the objective facing a measurement object,
having a second component including a lens which is arranged behind the first component,
wherein a first air gap is formed between the first component and the second component,
having a third component including a lens group which is arranged behind the second component,
wherein a second air gap is formed between the second component and the third component, and
having a fourth component including a lens group which is arranged behind the third component,
wherein a fifth component including a lens, a sixth component including a lens, and a seventh component including a lens are provided behind the fourth component,
wherein for the adaptation of optical properties of the objective to an immersion medium an adjusting device is provided for changing at least the first and second air gaps,
wherein
for the correction of aberrations, a third air gap is formed between the fourth component and the fifth component, a fourth air gap is formed between the fifth component and the sixth component and a fifth air gap is formed between the sixth component and the seventh component, and wherein the adjusting device is further configured for changing the fourth air gap,
wherein
for the correction of aberrations, the third air gap is in the form of a rearwardly bent meniscus-shaped air lens, the fourth air gap is in the form of a biconcave air lens and the fifth air gap is in the form of a meniscus-shaped air lens bent towards the measurement object.

2. The objective of claim 1,
wherein
a constant further air gap is provided between the third component and the fourth component or
the third and fifth air gaps are constant.

3. The objective of claim 1,
wherein
a further air gap is provided between the third component and the fourth component and
the adjusting device is also adapted to change the third and fifth air gaps and the further air gap between the third component and the fourth component.

4. The objective of claim 1,
wherein
in order to adjust the first air gap a first frame is provided, with which the second component, the third component, the fourth component, fifth component, sixth component, and seventh component are fixedly held relative to each other, and
the adjusting device is adapted to adjust the first frame relative to the first component in the direction of the optical axis of the objective.

5. The objective of claim 1,
wherein
in order to adjust the second air gap a second frame is provided, with which at least the third component and the fourth component are fixedly held relative to each other, and
the adjusting device is adapted to adjust the second frame relative to the second component in the direction of the optical axis of the objective.

6. The objective of claim 1,
wherein
in order to adjust the fourth air gap a third frame is provided, with which the sixth component and seventh component are fixedly held relative to each other, and
the adjusting device is adapted to adjust the third frame relative to the fourth component in the direction of the optical axis of the objective.

7. The objective of claim 3,
wherein
the adjusting device comprises at least one correction ring which is accessible from an outer side of the objective and which can be rotated around the optical axis of the objective, and
for displacement of the frames along the optical axis upon rotation of the at least one correction ring, the frames are respectively connected to one of the correction rings by means of gear elements.

8. The objective of claim 7,
wherein
the gear elements respectively comprise a thread or a cam gear.

9. The objective of claim 1,
wherein
the adjusting device comprises piezoelectric actuators and for the displacement of the frames along the optical axis said frames are respectively connected to at least one of the piezoelectric actuators.

10. The objective of claim 1,
wherein
the fifth, sixth, and seventh components are respectively single lenses.

11. The objective of claim 1,
wherein
the fifth component is a collective lens,
the sixth component is a collective lens and
the seventh component is a diverging lens.

12. The objective of claim 11,
wherein
the fifth component is a rearwardly bent meniscus lens,
the sixth component is a forwardly bent meniscus lens and
the seventh component is a forwardly bent meniscus lens.

13. The objective of claim 1,
wherein
the first component comprises a first and a second lens,
the first lens is a fill lens and
the second lens is a parent lens which directly adjoins the fill lens.

14. The objective of claim 1,
wherein
the second component is a collective lens.

15. The objective of claim 14,
wherein
the second component is a rearwardly bent meniscus lens.

16. The objective of claim 1,
wherein
at least one of the third component and the fourth component comprises three lenses configured as a triple cemented element, lenses of the third component that are cemented being referred to as a fourth, fifth and sixth lens, and lenses of the fourth component that are cemented being referred to as a seventh, eighth and ninth lens.

17. The objective of claim 1,
wherein
the third component has a collective effect and
the fourth component has a collective effect.

18. The objective of claim 16,
wherein
the fifth lens is a collective lens and
the eighth lens is a diverging lens.

19. The objective of claim 16,
wherein
the fifth lens is a diverging lens and
the eighth lens is a collective lens.

20. A light microscope
having an objective as defined in claim 1.

21. The light microscope of claim 20,
wherein
a motor is provided for operating the adjusting device.

22. The light microscope of claim 20,
wherein
an electronic memory is provided, in which adjustments to be achieved for the adjusting device are stored in dependence upon different immersion media, the settings stored in the electronic memory can be selected via an input device by a user and
an electronic control system is provided for controlling the motor according to a setting selected by the user.

23. An immersion objective for a light microscope,
having a first component including a lens group which is arranged on a side of the objective facing a measurement object,
having a second component including a lens which is arranged behind the first component,
wherein a first air gap is formed between the first component and the second component,
having a third component including a lens group which is arranged behind the second component,
wherein a second air gap is formed between the second component and the third component, and
having a fourth component including a lens group which is arranged behind the third component, wherein a fifth component including a lens, a sixth component including a lens, and a seventh component including a lens are provided behind the fourth component, wherein for the adaptation of optical properties of the objective to an immersion medium an adjusting device is provided for changing at least the first and second air gaps, wherein for the correction of aberrations, a third air gap is formed between the fourth component and the fifth component, a fourth air gap is formed between the fifth component and the sixth component and a fifth air gap is formed between the sixth component and the seventh component, and wherein the adjusting device is further configured for changing the fourth air gap, where the third air gap, the forth air gap and the fifth air gap are, in each case, air lenses, wherein the following relations hold:

$-5.3 < Q(A4) < -3.8; f(A4) < 0$ $-1.5 < Q(A5) < -1.1; f(A5) > 0$ $+8.3 < Q(A6) < +20.2; f(A6) < 0$ where Q, in each case, is given by $Q=|f'|*((2*n1-1)/r1+1/r2)$, wherein r1 is the curvature radius of a front surface of the respective air lens, r2 is the curvature radius of an opposing rear surface of the respective air lens, n1 is the refraction number of the medium before the front surface of the respective air lens, f' is the focal length of the respective air lens in the direction of the rear surface, f' is given by n2 and r2, n2 being the refraction number of the medium adjacent to the rear surface of the respective air lens, Q(A4) is the Q-value for the air lens realised by the third air gap, Q(A5) is the Q-value for the air lens realised by the forth air gap, Q(A6) is the Q-value for the air lens realised by the fifth air gap, f(A4) is the focal length of the air lens realised by the third air gap in the direction of the front surface, f(A5) is the focal length of the air lens realised by the forth air gap in the direction of the front surface, f(A6) is the focal length of the air lens realised by the fifth air gap in the direction of the front surface.

* * * * *